United States Patent [19]
Bruas et al.

[11] Patent Number: 5,746,411
[45] Date of Patent: May 5, 1998

[54] SUSPENSION PAD DESIGNED TO BE INTERPOSED BETWEEN TWO STRUCTURAL ELEMENTS, IN PARTICULAR BETWEEN A FRAME AND A CONTAINER TANK

[75] Inventors: Michel Y. Bruas, Paris; Henri J. Cainaud, Fontaine les Dijon, both of France

[73] Assignee: Michel Bruas, Paris, France

[21] Appl. No.: 385,960

[22] Filed: Feb. 9, 1995

[30] Foreign Application Priority Data

Feb. 9, 1994 [FR] France .................................. 94 01470

[51] Int. Cl.$^6$ .................................................. F16M 13/00
[52] U.S. Cl. ........................... 248/635; 248/632; 248/634
[58] Field of Search ................................. 248/632, 633, 248/634, 635, 621

[56] References Cited

U.S. PATENT DOCUMENTS

| | | |
|---|---|---|
| 2,239,319 | 4/1941 | Halford et al. ............................ 248/634 |
| 2,914,275 | 11/1959 | Mitchell ..................................... 248/633 |
| 3,397,856 | 8/1968 | Sullivan et al. ....................... 248/633 X |
| 3,409,284 | 11/1968 | Rix . |
| 3,782,788 | 1/1974 | Koester . |
| 4,603,844 | 8/1986 | Chen ..................................... 248/635 X |
| 4,817,921 | 4/1989 | Stevenson ............................ 248/634 X |
| 4,887,788 | 12/1989 | Fischer et al. ....................... 248/632 X |
| 5,284,315 | 2/1994 | Hofmann et al. .................... 248/632 X |

FOREIGN PATENT DOCUMENTS

| | | |
|---|---|---|
| 1113530 | 12/1955 | France . |
| 1224714 | 6/1960 | France .................................. 248/635 |
| 1214479 | 10/1964 | Germany . |
| 2114662 | 10/1972 | Germany . |
| 19531 | 2/1913 | United Kingdom . |
| 924136 | 4/1963 | United Kingdom . |
| 2032574 | 9/1979 | United Kingdom . |

*Primary Examiner*—Leslie A. Braun
*Assistant Examiner*—Anita M. King
*Attorney, Agent, or Firm*—Roylance,Abrams,Berdo & Goodman, L.L.P.

[57] ABSTRACT

The present invention relates to a suspension pad designed to be placed in a cavity (8) formed by two structural elements (1, 3; 2, 4), in particular by a frame and a container tank, and to prevent the transmission of vibrations and shocks from one structural element to the other. This pad comprises two parallel supporting surfaces (5), a lateral surface which is provided with an annular groove (7) equidistant from the supporting surfaces and is defined by two coaxial and opposing cone trunks, the small bases of which join up with the supporting surfaces (5) and the large bases of which join up with the sides of the annular groove (7), and a central orifice (9) intended to permit the passage of connecting means (11, 12) designed to connect the structural elements (1, 3; 2, 4) to one another. It is characterized by a core (16) formed of a rigid material capable of absorbing low frequency vibrations and by a shell (17) formed of a material capable of absorbing high frequency vibrations, the core being located inside the shell.

15 Claims, 2 Drawing Sheets

SUSPENSION PAD DESIGNED TO BE INTERPOSED BETWEEN TWO STRUCTURAL ELEMENTS, IN PARTICULAR BETWEEN A FRAME AND A CONTAINER TANK

FIELD OF THE INVENTION

The present invention relates to a suspension pad designed to be placed in a cavity formed by two structural elements, in particular by a frame and a container tank, and to prevent the transmission of vibrations and shocks from one structural element to the other, comprising two parallel supporting surfaces, a lateral surface which is provided with an annular groove equidistant from the supporting surfaces and is defined by two coaxial and opposing cone trunks, the small bases of which join up with the supporting surfaces and the large bases of which join up with the sides of the annular groove, and a central orifice intended to permit the passage of connecting means designed to connect the structural elements to one another, the central orifice extending perpendicularly to the supporting surfaces.

BACKGROUND OF THE INVENTION

Current suspension pads of this type are capable of absorbing only vibrations the frequencies of which are close to one another, which limits the scope of their use.

SUMMARY OF THE INVENTION

The present invention proposes to solve this problem and, for this purpose, it provides a supension pad having the structure described above, and which is characterized in that it includes a core formed of a rigid material capable of absorbing low frequency vibrations and a shell formed of a material capable of absorbing high frequency vibrations, the core being located inside the shell.

This suspension pad can absorb vibrations the frequencies of which are extend over a very wide range, ranging, for example from 0 to 1000 Hz. It is therefore capable of absorbing shocks of considerably differing natures and intensities, which enables it to be used satisfactorily under widely differing conditions.

Preferably, the core comprises two end surfaces which are parallel and adjacent to the supporting surfaces and a neck located substantially half way from its end surfaces, and it is provided with means ensuring its anchoring to the shell.

When the suspension pad is subjected to the action of an external force applied in the vicinity of one of its supporting surfaces, the neck in the core permits a displacement of this bearing surface in relation to the other bearing surface and thus favours the absorption of the energy received.

Furthermore, the anchoring means ensure that the core and the shell do not move relatively to one another under the effect of an external force and prevent damage to the pad.

According to one particular form of embodiment, the anchoring means include at least one annular groove provided in each of the end surfaces of the core, the annular grooves being filled by the material forming the shell.

Alternatively, the anchoring means can include at least one annular rib projecting from each of the end surfaces of the core, the annular ribs extending into the material forming the shell.

According to another alternative embodiment, they can also include through holes provided in the core, parallel to the central orifice, these holes being angularly equidistant to one another and filled by the material forming the shell.

Advantageously, the core and the shell are formed of elastomers capable of regaining their initial shape when they are no longer subjected to stress.

The suspension pad according to the invention can thus retain over a period of time its shock absorbing properties and have a long useful life.

Furthermore, the hardness of the core is greater than that of the shell.

According to one particular form of embodiment, the core has a Shore A hardness in the order of 90 to 99, and preferably a Shore A hardness of 96, while the shell has a Shore A hardness in the order of 60 to 80, and preferably a Shore A hardness of 71.

The suspension pad according to the invention, which is perfectly laterally maintained in the cavity, can be deformed freely, at the annular groove on its lateral surface, under the effect of a compressive load.

In order to facilitate its deformation, the central orifice can also comprise an annular groove equidistant from the supporting surfaces.

On the other hand, the cone trunks on the lateral surface of the suspension pad can be provided with projections formed, for example, by annular ribs parallel to the supporting surfaces.

These projections, which are designed to be deformed under the effect of a relatively small load, are distributed so as to create a sort of superficial skin capable of absorbing the vibrations having a frequency situated in a predetermined range, ranging, for example, from 20 to 1000 Hz.

The supporting surfaces of the suspension pad can also be provided with projections formed, for example, by concentric annular ribs, these projections having the same function as that of the projections provided on the cone trunks.

BRIEF DESCRIPTION OF THE DRAWINGS

Three forms of embodiment of the present invention will now be described by way of non-limitative examples with reference to the annexed drawings, wherein.

DETAILED DESCRIPTION OF PREFERRED EMBODIMENT

Figure 1:
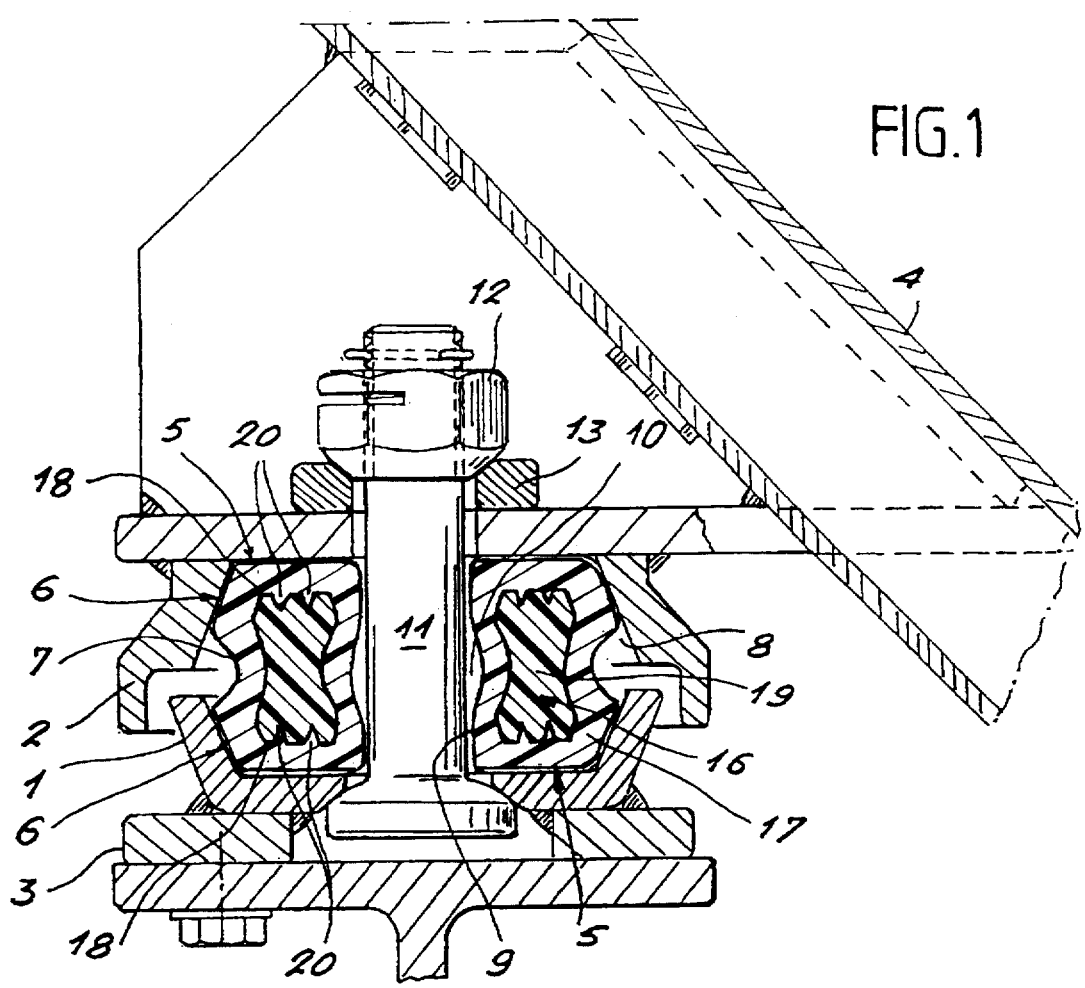
FIG. 1 is a cross-sectional view of a suspension pad according to the invention, interposed between a frame and a container tank, partially represented.

The suspension pad shown in FIG. 1 is interposed between two coaxial cupels 1 and 2 the entries of which are adjacent and which are integral respectively with frame 3 and tank 4 of a tank container. It goes without saying, however, that the use of this pad in a field other than that of tank containers would not be outside the scope of the present invention.

The suspension pad includes a body of revolution having two parallel supporting surfaces 5 and a lateral surface comprising two coaxial trunk cones 6 separated from one another by an annular groove 7 equidistant from supporting surfaces 5.

Cone trunks 6, which are identical, join up with supporting surfaces 5 via their small bases, and with the sides of the annular groove 7 via their large bases.

Cupels 1 and 2 form between them a cavity 8 with the inner surface of which supporting surfaces 5 and cone trunks 6 of the suspension pad are in intimate contact.

The suspension pad is provided with a central orifice 9 extending perpendicularly to its supporting surfaces 5 and comprising an annular groove 10 equidistant from its ends.

The central orifice 9 permits the passage of a bolt 11 the shank of which passes through the bottoms of cupels 1 and 2, with the head of this bolt bearing against the outer face of the bottom of cupel 1, while its threaded end receives a screw 12 bearing against a washer 13 pressing against the outer face of the bottom of cupel 2.

Bolt 11 and nut 12 thus connect frame 3 and tank 4 in the area of the suspension pad.

Cupels 1 and 2 hold the pad perfectly in position, but do not prevent it from being freely deformed in the area of its grooves 7 and 10 under the effect of a compressive load and, consequently, from performing its function correctly.

In order to compensate for lack of parallelism between the bottoms of the cupels and to balance the loads exerted on the suspension pad, the head of bolt 11 comprises a section having the shape of a spherical cap pressed against a bevelled portion produced at the outer end of the bore provided in the bottom of cupel 2.

Figure 2:
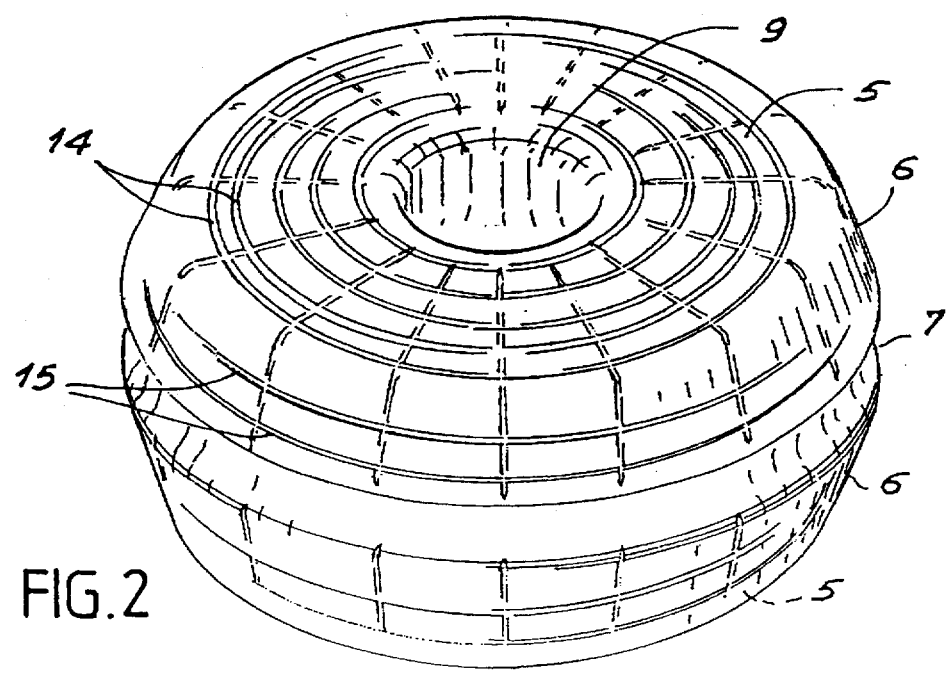
FIG. 2 is a perspective view of the suspension pad shown in FIG. 1.

With more particular reference to FIG. 2, it will further be noted that supporting surfaces 5 are provided with concentric annular ribs 14, while cone trunks 6 are provided with annular ribs 15, parallel to supporting surfaces 5. Ribs 14 and 15 are designed to be deformed by the effect of a relatively small force and to form a sort of superficial skin enabling the suspension pad to absorb the vibrations that have a frequency in a range of, for example, 20 to 1000 Hz when the said suspension pad is mounted on a container having a tank of approximately 20,000 liters.

Returning now to FIG. 1, it will be noted that the body of the suspension pad has a core 16 formed of a rigid material capable of being deformed in a perfectly elastic manner under the effect of a compressive load, and of absorbing the low frequency vibrations, for example those in the order of 0 to 20 Hz, and a shell 17 enclosing core 16 and itself formed of a material having low rebound resilience and a high delta tangent at ambient temperature and thus capable of absorbing vibrations having a high frequency, for example in the order of 20 to 1000 Hz.

It will be noted here that ribs 14 of supporting surfaces 5 and ribs 15 of cone trunks 6 form an integral part of shell 17.

The materials constituting core 16 and shell 17 are preferably elastomers. They are chosen for their ability to regain their initial shape after the removal of the stresses applied to them, and they have a Shore A hardness in the order of 90 to 99, in the case of the material constituting the core, and a Shore A hardness in the order of 60 to 80 in that of the material constituting the shell.

With reference to FIG. 1, it will also be noted that core 16 has two end surfaces 18 respectively parallel and adjacent to supporting surfaces 5, and a neck 19 located substantially half way between the end surfaces 18, the neck being provided to favour relative movement between the portions of the suspension pad that are adjacent to supporting surfaces 5 when one of them is subjected to the effect of an external force.

It is further pointed out that the end surfaces 18 of the core are provided with annular grooves 20 and that the material forming the shell 17 extends between the grooves, which increases the bond between the core and the shell and precludes any risk of accidental separation between them under the effect of an external force.

The manufacture of the suspension pad according to the invention does not pose any particular problem. The core is, in face, produced by moulding, while the shell is produced by overmoulding.

The material used to produce the core is hot cast at atmospheric pressure in a suitable mould, and then stove polymerized. As to the material used to produce the shell, it is hot cast in a suitable overmoulding mould containing the core, and then stove polymerized.

For the sake of completeness, it should be mentioned that the elastomers used to form the core and the shell are preferably high performance compact polyurethane elastomers. By way of example, the core could be made of a polyurethane marketed under the trade name of ELADIP E 167 having a Shore A hardness of 96, while the shell could be made from a polyurethane marked under the trade name ELADIP E 183 having a Shore A hardness of 71.

Figure 3:
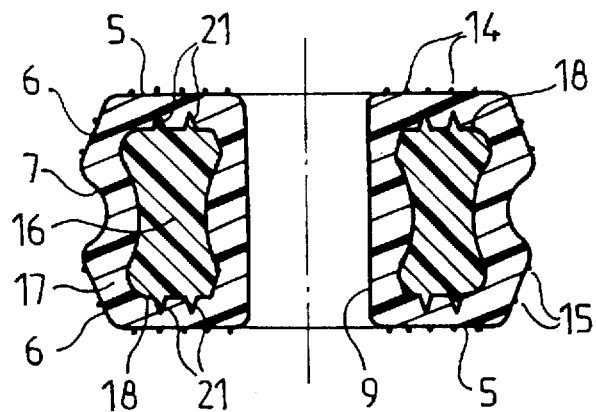
FIG. 3 is a cross-sectional view of a suspension pad according to an alternative form of embodiment.

The suspension pad according to the form of embodiment shown in FIG. 3 differs from the pad described with reference to FIGS. 1 and 2 in that the annular grooves 20 provided in the end surfaces 18 of core 16 have been replaced by annular ribs 21 projecting into the material forming shell 17.

There is no risk, therefore, of core 16 and shell 17 moving in relation to one another under the effect of an external force.

Figure 4:
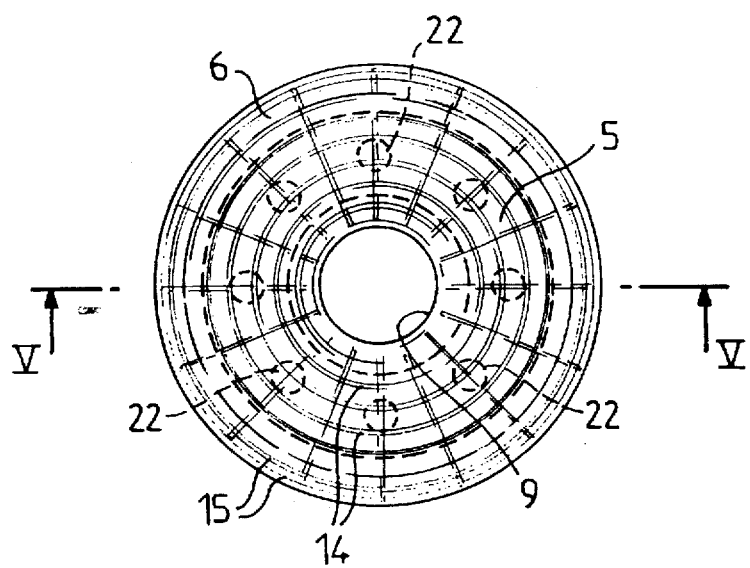
FIG. 4 is a top view of a suspension pad according to another alternative form of embodiment.
Figure 5:
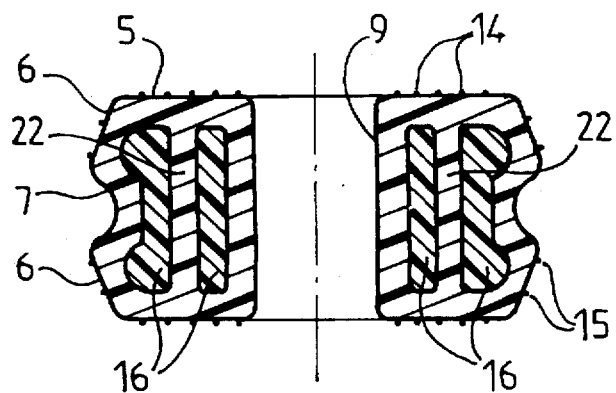
FIG. 5 is a schematic cross-sectional view of the pad shown in FIG. 4.

The suspension pad according to the form of embodiment represented in FIGS. 4 and 5 differs from the pads described previously in that through holes 22 are provided in core 16 parallel to central orifice 9, these holes being angularly equidistant from one another and filled with the material forming shell 7.

Thanks to the special inner constitution of this pad, core 16 is perfectly integral with shell 17 and cannot, therefore, be separately accidentally from the latter when the pad is subjected to shocks.

We claim:

1. A suspension pad designed to be placed in a cavity (8) formed by two structural elements (1, 3; 2, 4), in particular by a frame and a container tank, and to prevent the transmission of vibrations and shocks from one structural element to the other, comprising two parallel supporting surfaces (5), a lateral surface which is provided with an annular groove (7) equidistant from the supporting surfaces and is defined by two coaxial and opposing cone trunks having small bases attached to the supporting surfaces (5) and large bases attached to the sides of the annular groove (7), and a central orifice (9) intended to permit the passage of connecting means (11, 12) designed to connect the structural elements (1, 3; 2, 4) to one another, the central orifice extending perpendicularly to the supporting surfaces (5), characterized in that the suspension pad includes a core (16) formed of a rigid material capable of absorbing low frequency vibrations, and a shell (17) formed of a material capable of absorbing high frequency vibrations, the core being located inside the shell and comprising two end surfaces (18) which are parallel and adjacent to the supporting surfaces (5) and a neck (19) located between the end surfaces.

2. A suspension pad according to claim 1, characterized in that the neck (19) of the core is located substantially half way from the end surfaces, and the core is provided with means (20, 21, 22) for anchoring the core to the shell (17).

3. A suspension pad according to claim 2, characterized in that the anchoring means include at least one annular groove (20) provided in each of the end surfaces (18) of the core (16), the annular grooves (20) being filled by the material forming the shell.

4. A suspension pad according to claim 2, characterized in that the anchoring means include at least one annular rib (21) projecting from each of the end surfaces (18) of the core (16), the annular ribs (21) extending into the material forming the shell (17).

5. A suspension pad according to claim 2, characterized in that the anchoring means include through holes (22) provided in the core (16), parallel to the central orifice (19), these holes being angularly equidistant to one another and filled by the material forming the shell.

6. A suspension pad according to claim 1, characterized in that the core (16) and the shell (17) are formed of elastomers capable of regaining their initial shape when they are no longer subjected to stress.

7. A suspension pad according to claim 1, characterized in that the core (16) is of greater hardness than that of the shell (17).

8. A suspension pad according to claim 1, characterized in that the core (16) has a Shore A hardness in the order of 90 to 99, while the envelope (17) has a Shore A hardness in the order of 60 to 80.

9. A suspension pad according to claim 1, characterized in that the central orifice (9) comprises an annular groove (10) equidistant from the supporting surfaces (5).

10. A suspension pad according to claim 1, characterized in that the cone trunks (6) are provided with projections (15).

11. A suspension pad according to claim 10, characterized in that the projections (15) are annular ribs parallel to the supporting surfaces (5).

12. A suspension pad according to claim 1, characterized in that the supporting surfaces (5) are provided with projections (14).

13. A suspension pad according to claim 12, characterized in that the projections (14) are concentric annular ribs.

14. A suspension pad designed to be placed in a cavity (8) formed by two structural elements (1, 3; 2, 4), in particular by a frame and a container tank, and to prevent the transmission of vibrations and shocks from one structural element to the other, comprising two parallel supporting surfaces (5) provided with projections (14), a lateral surface which is provided with an annular groove (7) equidistant from the supporting surfaces and is defined by two coaxial and opposing cone trunks having small bases attached to the supporting surfaces (5) and large bases attached to the sides of the annular groove (7), wherein the annular groove is unobstructed to permit the pad to freely deform, and a central orifice (9) intended to permit the passage of connecting means (11, 12) designed to connect the structural elements (1, 3; 2, 4) to one another, the central orifice extending perpendicularly to the supporting surfaces (5), characterized in that the suspension pad includes a core (16) formed of an elastomeric rigid material capable of absorbing low frequency vibrations, and a shell (17) formed of an elastomeric material capable of absorbing high frequency vibrations, said shell completely surrounding said core.

15. A suspension pad according to claim 14, characterized in that the projections (14) are concentric annular ribs.

* * * * *